(12) United States Patent
Dong et al.

(10) Patent No.: US 8,817,649 B2
(45) Date of Patent: Aug. 26, 2014

(54) ADAPTIVE MONITORING OF TELECOMMUNICATIONS NETWORKS

(75) Inventors: Wei Dong, Richardson, TX (US);
Robert Todd Wilkinson, Plano, TX (US)

(73) Assignee: Tektronix, Inc., Beaverton, OR (US)

( * ) Notice: Subject to any disclaimer, the term of this patent is extended or adjusted under 35 U.S.C. 154(b) by 341 days.

(21) Appl. No.: 13/446,654

(22) Filed: Apr. 13, 2012

(65) Prior Publication Data
US 2013/0272144 A1    Oct. 17, 2013

(51) Int. Cl.
*H04L 12/26* (2006.01)

(52) U.S. Cl.
USPC .......................................................... 370/252

(58) Field of Classification Search
CPC .................. H04L 12/26; H04L 47/10
USPC .......................................................... 370/252
See application file for complete search history.

(56) References Cited

U.S. PATENT DOCUMENTS

| | | |
|---|---|---|
| 6,920,112 B1 | 7/2005 | McCloghrie et al. |
| 2007/0038744 A1 | 2/2007 | Cocks et al. |
| 2009/0059791 A1 * | 3/2009 | Saxena .......................... 370/235 |
| 2009/0257352 A1 | 10/2009 | Imai |

OTHER PUBLICATIONS

Communication and Search Report mailed on Sep. 23, 2013 in corresponding Europea Patent Application No. 13 162 468.6.

* cited by examiner

*Primary Examiner* — Shripal Khajuria
(74) *Attorney, Agent, or Firm* — Edwards Wildman Palmer LLP; Scott D. Wofsy; Christopher J. Capelli (57) ABSTRACT

Systems and methods for the adaptive monitoring of telecommunications networks are described. In some embodiments, a method may include monitoring traffic transmitted through a mobile telecommunications network (e.g., 3G, 4G, LTE, etc.) and identifying a monitoring rule. The monitoring rule may associate a selected portion of the traffic (e.g., based on content type, source, destination, transport protocol, session, etc.) with a monitoring sampling ratio, and the monitoring sampling ratio may determine a fraction of the selected portion of the traffic usable to provide one or more performance indicators (e.g., service indicators, network congestion, connection maintenance, service quality, and/or network availability). The method may further include modifying the monitoring sampling ratio in response to a change in network monitoring conditions (e.g., one or more probes operating at or near capacity, scheduled maintenance events, peak traffic times, etc.)

17 Claims, 4 Drawing Sheets

ADAPTIVE MONITORING OF TELECOMMUNICATIONS NETWORKS

TECHNICAL FIELD

This specification is directed, in general, to network monitoring, and, more particularly, to systems and methods for adaptively monitoring telecommunications networks.

BACKGROUND

Mobile data networks continue to experience an unprecedented explosion in total traffic, particularly as new types of client devices (e.g., web-enabled smart phones, tablet devices, Internet-enabled TVs, gaming consoles, etc.) begin to consume larger amounts of bandwidth. Conventional network monitoring solutions typically have two components. First, one or more entities known as "probes" receive the totality of the network data and perform analysis and/or correlation of that entire data. Then, a server (or a cluster of servers) further aggregates the processed data and presents it to end-users.

As the inventors hereof have recognized, however, conventional monitoring cannot be easily scaled to meet the current traffic expansion. For most entities, analyzing 100% of their network traffic will soon become a cost-prohibitive undertaking. Accordingly, to address these and other issues, the inventors hereof have developed systems and methods for adaptively monitoring telecommunications networks.

SUMMARY

Embodiments of systems and methods for adaptively monitoring telecommunications networks are described herein. In an illustrative, non-limiting embodiment, a method may include monitoring traffic transmitted through a mobile telecommunications network and identifying a monitoring rule, the monitoring rule associating a selected portion of the traffic with a monitoring sampling ratio, the monitoring sampling ratio determining a fraction of the selected portion of the traffic usable to provide one or more performance indicators. The method may also include modifying the monitoring sampling ratio in response to a change in network monitoring conditions.

In some implementations, the selected portion of the traffic may include traffic having at least one of: a common address, a common subscriber identifier, a common transport protocol, a common port number, or a common content type. The one or more performance indicators may include at least one of: a service performance indicator, a network congestion indicator, a connection maintenance indicator, a service quality indicator, or a network availability indicator. Moreover, the change in network monitoring conditions may include a change in the operation of network equipment.

The method may also include predicting the change in network monitoring conditions based, at least in part, upon historical network data. Additionally or alternatively, the method may include identifying the change in network monitoring conditions based, at least in part, upon a network maintenance schedule. In some cases, the change in monitoring conditions may cause a decrease in monitoring capacity, and modifying the monitoring sampling ratio may include decreasing the monitoring sampling ratio. Conversely, the change in monitoring conditions may cause an increase in monitoring capacity, and modifying the monitoring sampling ratio may include increasing the monitoring sampling ratio.

In some embodiments, modifying the monitoring sampling ratio may include modifying the monitoring sampling ratio in response to a determination that a priority code associated with the monitoring rule allows the modification. The method may also include transmitting an indication of the modified monitoring sampling ratio to one or more monitoring probes. The method may further include adjusting a statistical confidence level associated with the one or more performance indicators based, at least in part, upon the modified monitoring sampling ratio.

In another illustrative, non-limiting embodiment, a method may include identifying a first monitoring rule, the first monitoring rule configured to associate a first portion of monitored network traffic with a first monitoring sampling ratio, the first monitoring rule having a first priority level. The method may also include identifying a second monitoring rule, the second monitoring rule configured to associate a second portion of monitored network traffic with a second monitoring sampling ratio, the second monitoring rule having a second priority level. The method may further include detecting a reduction in monitoring capacity and, in response to the first priority level being greater than the second priority level, reducing the second monitoring sampling ratio based, at least in part, upon the reduction in monitoring capacity.

In some implementations, the method may include predicting the reduction in monitoring capacity based, at least in part, upon historical data. Additionally or alternatively, the method may include identifying the reduction in monitoring capacity based, at least in part, upon maintenance information. The method may further include transmitting the reduced second monitoring sampling ratio to one or more probes and reducing a statistical confidence level associated with one or more performance indicators, the one or more performance indicators calculated based, at least in part, upon the second portion of the monitored network traffic.

In yet another illustrative, non-limiting embodiment, a method may include identifying a network monitoring rule implemented via a first monitoring probe and via a second monitoring probe, the network monitoring rule associating a first portion of monitored network traffic with a first monitoring sampling ratio at the first monitoring probe, and the network monitoring rule associating a second portion of monitored traffic with a second monitoring sampling ratio at the second monitoring probe. The method may also include, in response to a capacity reduction in the first monitoring probe, reducing the first monitoring sampling ratio and increasing the second monitoring sampling ratio.

In some cases, prior to reducing the first monitoring sampling ratio and increasing the second monitoring sampling ratio, the first and second monitoring sampling ratios may be equal to each other. In other cases, the first and second monitoring sampling ratios may be different from each other. Additionally or alternatively, the first monitoring sampling ratio may be proportional to a first volume of traffic received by the first monitoring probe and the second monitoring sampling ratio may be proportional to a second volute of traffic received by the second monitoring probe. In some embodiments, the method may include increasing the second monitoring ratio by an amount configured to offset the reduction in the first monitoring sampling ratio and maintain a statistical confidence level associated with a performance indicator. For example, the performance indicator may be calculated based, at least in part, upon the first and second portions of monitored traffic.

In some embodiments, one or more of the methods described herein may be performed by one or more computer systems (e.g., in the form of a network monitoring probe, controller, or the like). In other embodiments, a tangible computer-readable storage medium may have program instructions stored thereon that, upon execution by one or more computer or network monitoring systems, cause the one or more computer systems to perform one or more operations disclosed herein. In yet other embodiments, a system may include at least one processor and a memory coupled to the at least one processor, the memory configured to store program instructions executable by the at least one processor to perform one or more operations disclosed herein.

BRIEF DESCRIPTION OF THE DRAWINGS

Reference will now be made to the accompanying drawings, where.

While this specification provides several embodiments and illustrative drawings, a person of ordinary skill in the art will recognize that the present specification is not limited only to the embodiments or drawings described. It should be understood that the drawings and detailed description are not intended to limit the specification to the particular form disclosed, but, on the contrary, the intention is to cover all modifications, equivalents and alternatives falling within the spirit and scope of the claims. Also, any headings used herein are for organizational purposes only and are not intended to limit the scope of the description. As used herein, the word "may" is meant to convey a permissive sense (i.e., meaning "having the potential to"), rather than a mandatory sense (i.e., meaning "must"). Similarly, the words "include," "including," and "includes" mean "including, but not limited to."

DETAILED DESCRIPTION

Figure 1:
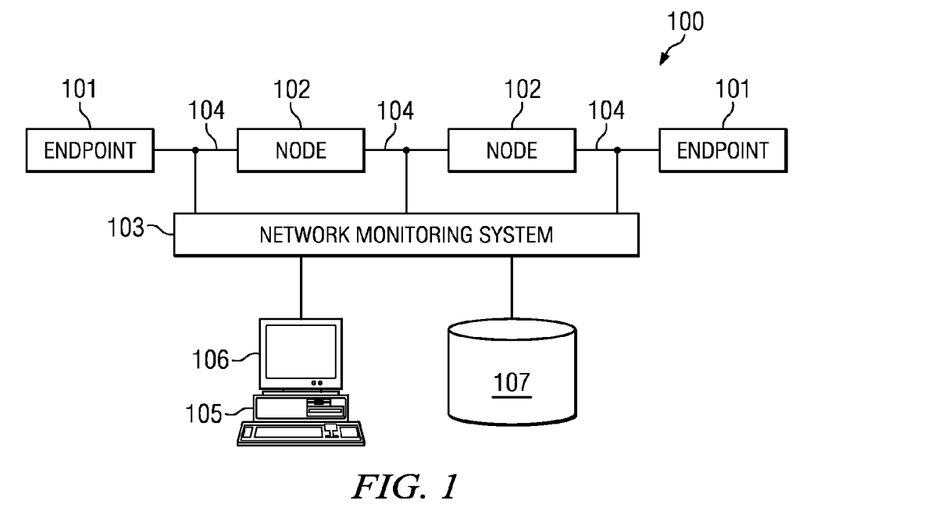
FIG. 1 is a block diagram of a network monitoring environment according to some embodiments.

FIG. 1 illustrates a block diagram of a network monitoring environment according to some embodiments. Particularly, telecommunications network 100 includes network nodes 102 and endpoints 101. For example, network 100 may include a wireless broadband network, a 3G network, a 4G network, a 3GPP Long Term Evolution (LTE) network, a voice-over-IP (VoIP) network, an IP Multimedia Subsystem (IMS) network, etc. Although only two nodes 102 and two endpoints 102 are shown in FIG. 1, it will be understood that network 100 may comprise any number of nodes 102 and endpoints 101. Moreover, it will be understood that the nodes 102 and endpoints 101 in network 100 may be interconnected in any suitable manner, including being coupled to one or more other nodes 102 and/or endpoints 101.

In some implementations, endpoints 101 may represent, for example, computers, mobile devices, user equipment (UE), client applications, server applications, or the like. Meanwhile, nodes 102 may be components in an intranet, Internet, or public data network, such as a router or gateway. Nodes 102 may also be components in a 3G or 4G wireless network, such as a Serving GPRS Support Node (SGSN), Gateway GPRS Support Node (GGSN) or Border Gateway in a General Packet Radio Service (GPRS) network, Packet Data Serving Node (PDSN) in a CDMA2000 network, a Mobile Management Entity (MME) in a Long Term Evolution/Service Architecture Evolution (LTE/SAE) network or any other core network nodes or routers that transfer data packets or messages between endpoints 101.

Many packets traverse links 104 and nodes 102, as data is exchanged between endpoints 101. These packets may represent many different sessions and protocols. For example, if endpoint 101 is used for a voice or video call, then it may exchange Voice over Internet Protocol (VoIP) or Session Initiation Protocol (SIP) data packets with a SIP/VoIP server (i.e., the other endpoint 101) using Real-Time Transport Protocol (RTP). If endpoint 101 is used to send or retrieve email, device 102 may exchange Internet Message Access Protocol (IMAP), Post Office Protocol 3 Protocol (POP3), or Simple Mail Transfer Protocol (SMTP) messages with an email server (i.e., the other endpoint 101). If endpoint 101 is used to download or stream video, device 101 may use Real Time Streaming Protocol (RTSP) to establish and control media sessions with a video server (i.e., the other endpoint 101). Alternatively, the user at endpoint 101 may access a number of websites using Hypertext Transfer Protocol (HTTP) to exchange data packets with a web server (i.e., the other endpoint 101). It will be understood that packets exchanged between devices 101 may conform to numerous other protocols now known or later developed.

In a typical situation, approximately one percent of the packets traversing network 100 carry control data, such as information for setting-up, managing or tearing-down calls or sessions between endpoints 101. The other ninety-nine percent of the packets carry user data, such as actual voice, video, email or information content to and from devices 101.

Network monitoring system (NMS) 103 may be used to monitor the performance of network 100. Monitoring system 103 captures packets that are transported across links or interfaces 104 between nodes 102, endpoints 101, and/or any other network links or connections (not shown). In some embodiments, packet capture devices may be non-intrusively coupled to network links 104 to capture substantially all of the packets transmitted across the links. Although only three links 104 are shown in FIG. 1, it will be understood that in an actual network there may be dozens or hundreds of physical, logical or virtual connections and links between network nodes. In some cases, network monitoring system 103 may be coupled to all or a high percentage of these links. In other embodiments, monitoring system 103 may be coupled only to a portion of network 100, such as only to links associated with a particular carrier or service provider. The packet capture devices may be part of network monitoring system 103, such as a line interface card, or may be separate components that are remotely coupled to network monitoring system 103 from different locations.

Monitoring system 103 may include one or more processors running one or more software applications that collect, correlate and/or analyze media and signaling data packets from network 100. Monitoring system 103 may incorporate protocol analyzer, session analyzer, and/or traffic analyzer functionality that provides OSI (Open Systems Interconnection) Layer 2 to Layer 7 troubleshooting by characterizing IP traffic by links, nodes, applications and servers on network 100. In some embodiments, these operations may be provided, for example, by the IRIS® toolset available from Tektronix, Inc., although other suitable tools may exist or be later developed. The packet capture devices coupling network monitoring system 103 to links 104 may be high-speed, high-density probes that are optimized to handle high bandwidth IP traffic, such as the GEOPROBE® G10, also available from Tektronix, Inc., although other suitable tools may exist or be later developed. A service provider or network operator may access data from monitoring system 103 via user interface station 105 having a display or graphical user interface 106, such as the IRISVIEW configurable software framework that provides a single, integrated platform for several applications, including feeds to customer experience management systems and operation support system (OSS) and business support system (BSS) applications, which is also available from Tektronix, Inc., although other suitable tools may exist or be later developed.

Monitoring system 103 may further comprise internal or external memory 107 for storing captured data packets, user session data, and configuration information. Monitoring system 103 may capture and correlate the packets associated specific data sessions on links 104. In some embodiments, related packets can be correlated and combined into a record for a particular flow, session or call on network 100. These data packets or messages may be captured in capture files. A call trace application may be used to categorize messages into calls and to create Call Detail Records (CDRs). These calls may belong to scenarios that are based on or defined by the underlying network. In an illustrative, non-limiting example, related packets can be correlated using a 5-tuple association mechanism. Such a 5-tuple association process may use an IP correlation key that includes 5 parts: server IP address, client IP address, source port, destination port, and Layer 4 Protocol (Transmission Control Protocol (TCP), User Datagram Protocol (UDP) or Stream Control Transmission Protocol (SCTP)).

Accordingly, network monitoring system 103 may be configured to sample (e.g., unobtrusively) related data packets for a communication session in order to track the same set of user experience information for each session and each client without regard to the protocol (e.g., HTTP, RTMP, RTP, etc.) used to support the session. For example, monitoring system 103 may be capable of identifying certain information about each user's experience, as described in more detail below. A service provider may use this information, for instance, to adjust network services available to endpoints 101 such as the bandwidth assigned to each user, and the routing of data packets through network 100.

As the capability of network 100 increases toward 10 Gigabits/second (Gbps) and beyond (e.g., 100 Gbps), however, each link 104 supports more users' flows and sessions. In some embodiments, link 104 may be a 10 Gbps or a collection of 10 Gbps links (e.g., one or more 100 Gbps links) supporting thousands or tens of thousands of users or subscribers. Many of the subscribers may have multiple active sessions, which may result in an astronomical number of active flows on link 104 at any time where each flow includes many packets. With such a very large volume of packets, it becomes difficult for a service provider or network operator to analyze all the traffic across network 100, for example, to identify problem nodes or links. Some systems may collect all the data for a relatively short period of time, hoping that the sample taken is representative. Other systems may collect a percentage of network traffic all the time and attempt to extrapolate the data for the entire network by simply scaling it.

Figure 2:
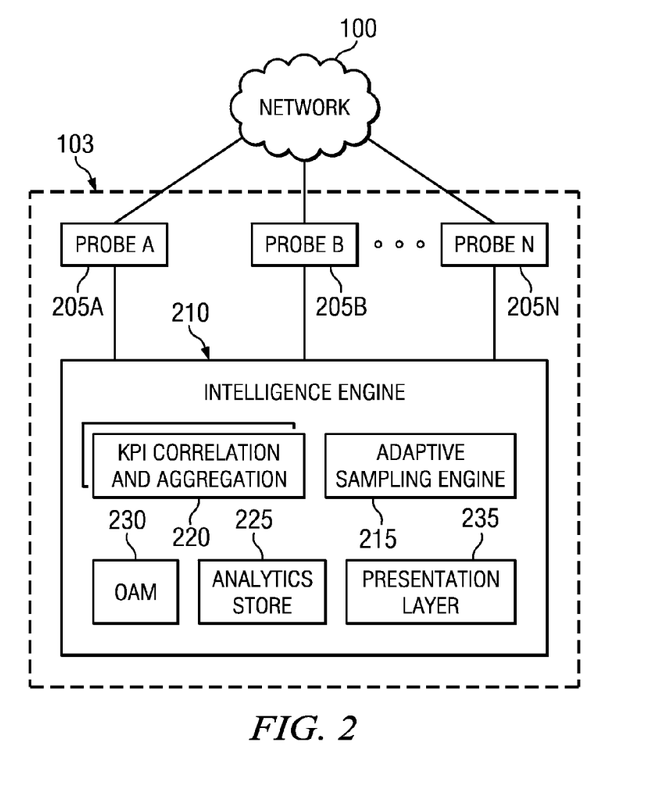
FIG. 2 is a block diagram of a network monitoring system according to some embodiments.

To address these and other concerns, various systems and methods described herein may enable the adaptive monitoring of telecommunications networks. Hence, FIG. 2 illustrates network monitoring system 103 according to some embodiments. As shown, one or more monitoring devices or probes 205A-N may be coupled to network 100. Each of devices 205A-N (i.e., a first tier) may also be coupled to intelligence engine 210 (i.e., a second tier). Although the system of FIG. 2 is shown as a two-tier architecture, it should be understood by a person of ordinary skill in the art in light of this disclosure that the principles and techniques discussed herein may be extended to a larger number of tiers (e.g., a three- or four-tiered network monitoring architecture).

Generally speaking, probes 205A-N may tap into network 100 and monitor its data. For example, such one or more of probes 205A-N may be coupled to one or more links 104 of network 100 shown in FIG. 1. Intelligence engine 210 may include a plurality of distributed components configured to perform further analysis and presentation of data to users. For example, intelligence engine may include adaptive sampling engine 215; Key Performance Indicator (KPI) correlation and aggregation module 220; analytics store 225; Operation, Administration, and Maintenance (OAM) module 230; and presentation layer 235.

In some embodiments, devices 205A-N may be configured to monitor a programmable fraction of the network traffic that it is tapped into (e.g., 10 Gbps, 100 Gpbs, etc.). Such a programmable portion may be defined, for example, by a sampling ratio or the like. In some cases, each device 205A-N may analyze traffic intelligently to distinguish high-value traffic from low-value traffic (or any other selected forms traffic) based on a set of heuristics. Examples of such heuristics may include, but are not limited to, traffic having a common source or destination address, a common subscriber identifier, a common transport protocol, a common port number, a common content type, etc. Depending upon the different type of traffic, a different sampling rule (or set of rules) may apply. Each rule may in turn dictate a portion of that traffic that will be used in subsequent processing such as, for example, the calculation of KPIs or the like. Examples of KPIs may include, but are not limited to, service performance indicators, network congestion indicators, connection maintenance indicators, service quality indicators, and/or network availability indicators.

Devices 205A-N may also be configured to aggregate data to enable backhauling, to generate netflows and basic KPI calculations, time stamping of data, port stamping of data, filtering out unwanted data, protocol classification, and deep packet inspection (DPI) analysis. Devices 205A-N may also be configured to may also be configured to perform stateful analysis of data, extraction of key parameters for call correlation and generation of call data records (CDRs), application specific processing, etc. In addition, devices 205A-N may be configured to distribute data to intelligence engine 210 in a variety of ways, which may include flow based or user session based balancing. Devices 205A-N may also provide dynamic load information (e.g., namely CPU and memory utilization) to intelligence engine 210 to enable certain adaptive monitoring operations.

Intelligence engine 210 may follow a distributed and scalable architecture. In some embodiments, module 220 may receive KPIs and may correlate information from front-end devices 205A-N. OAM module 230 may be used to configure and/or control front-end devices 205A-N, distribute software or firmware upgrades, etc. Presentation layer 235 may be configured to present KPI and other relevant information to the end-users. Analytics store 225 may include a storage or database for the storage of analytics data or the like. Adaptive sampling engine 215 is discussed in more detail with respect to FIG. 3 below.

In some implementations, intelligence engine 210 may be hosted at an offsite location (i.e., at a different physical location remote from front-end devices 205A-N). Additionally or alternatively, intelligence engine 210 may be hosted in a cloud environment.

Figure 3:
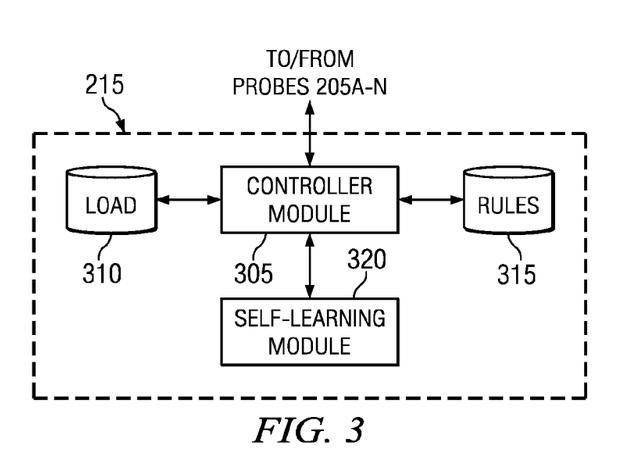
FIG. 3 is a block diagram of a monitoring probe according to some embodiments.

FIG. 3 is a block diagram of adaptive sampling engine 215 according to some embodiments. Controller module 305 may be coupled to one or more probes 205A-N, for example, through input ports of intelligence engine 210. Controller module 305 may also be coupled to load information database 310, sampling rules database 315, and self-learning module 320. In operation, controller module 305 may be configured to receive load information (e.g., CPU and/or memory usage) from one or more of probes 205A-N and to store that information in load database 310. Controller module 305 may also be configured to create and/or modify sampling rules stored in rules database 315. Based upon load information from database 310 and/or network condition determinations made by self-learning module 320, controller module may modify one or more aspects of the rules stored in database 315, as well as update corresponding probe(s) 205A-N with modified filters, priority codes, sampling ratios, etc.

An example of hypothetical sampling rules that may be stored in database 315 is provided in Table I below for purposes of illustration:

TABLE I

| Rule | Condition | Priority | Sampling Ratio |
|---|---|---|---|
| 1 | Subscriber = {A, B, or C} | 0 | SR = 100% |
| 2 | Subscriber = {D, E, or F} | 1 | SR = 0.5% |

In this example, controller module 305 may receive or store Rule 1 in database 315 such that, for any packets associated with subscribers A, B, or C, the sampling ratio is 100%. As to Rule 2, for packets identifying subscribers D, E, or F, the sampling ratio is 0.5%. Assume, in this example, that Rules 1 and 2 apply to all probe(s) 205A-N (other scenarios are shown as shown in Table II below). Thus, in this case, every packet (i.e., SR=100%) detected by network monitoring system 130 from and/or to subscribers A, B, and C may be used in subsequent processing such as, for example, to calculate KPIs associated with such traffic. Conversely, only 0.5% of the packets detected by system 130 from or to subscribers D, E, and F are used in KPI calculations for that traffic. In some implementations, Rule 1 may be applied with respect to important customers, whereas Rule 2 may be applied with respect to less critical subscribers. An example of a technique involving subscriber whitelisting or VIP monitoring is described in connection with FIG. 4.

When KPI parameters are calculated based upon sampled packets following each rule (and respective sampling ratios), each such parameter may be associated with a statistical confidence level or the like. In general, as a given sampling ratio decreases, the confidence level associated with a respective KPI parameter also tends to decrease. Conversely, as the sampling ratio increases, the confidence factor increases as well. In various embodiments, statistical confidence factors or levels may be calculated using any suitable mathematical or statistical model now existing or yet to be developed.

As shown in Table I, each rule may also include a priority code or level. In some cases, the priority code may be binary (other situations are illustrated in Table II below). For example, a "0" value may indicate that the corresponding sampling ratio cannot be modified (a higher priority), and a "1" value may indicate that the associated sampling ratio is subject to being adaptively modified (a lower priority) depending, for example, upon changes in network monitoring conditions (e.g., a defective probe is added to system 130, a new probe is added, etc.). In this scenario, controller module 305 may receive load information from probes 205A-N and/or database 310, and may attempt to modify the sampling ratios of Rules 1 and/or 2 accordingly.

For sake of explanation, assume that monitoring system 130 has a single probe, and that CPU and/or memory usage information obtained from the probe (or database 130) indicates that the probe is operating at its maximum capacity. In response, controller module 305 may change any modifiable sampling ratios (i.e., in Rule 2) by a predetermined amount (e.g., from 0.5% to 0.1%). Controller module 305 may then check upon the probe's CPU or memory usage information again and, if necessary, it may reduce modifiable sampling ratios further. In some implementations, once the modifiable sampling ratios fall below a minimum threshold (e.g., 10%, 0.1%, zero, etc.), otherwise immutable sampling ratios (i.e., in Rule 1) may also be subject to being reduced, for example, to prevent certain types of failures or the like.

In some cases, controller module 305 may receive historical or other operational information from self-learning module 320 that may trigger an adjustment of sampling ratios in sampling rules. For example, self-learning module 320 may determine, based on historical information, that network monitoring system 130 typically operates at or near capacity between the hours of 9:00 a.m. and 10:00 a.m. on weekdays; but otherwise it operates below capacity. Accordingly, controller module 305 may automatically adjust all modifiable sampling ratios downward during these peak hours, and upward outside of those hours. Additionally or alternatively, self-learning module 320 may determine, based on maintenance scheduling information, that one or more probes will be turned off during a certain time period. Thus, controller module 305 may automatically adjust sampling ratios accordingly.

In some implementations, self-learning module 320 may identify upcoming events that may affect network monitoring operations (e.g., scheduled maintenance, etc.), and it may estimate those effects, for example, in terms of potential reduction in statistical confidence levels or the like. If the impact upon confidence levels meets a threshold value, self-learning module 320 may give the user an option to intervene, for example, by preventing, canceling or rescheduling the upcoming event.

In other implementations, controller module 305 may take into account packet traffic or expected traffic information (e.g., provided by self-learning module 320) in order to determine a reduction (or increase) in monitoring sampling ratios or the like. Controller module 305 may also simulate the effect that a given modification in sampling ratios would cause upon each individual probe 205A-N (e.g., CPU and/or memory usage) and/or upon network monitoring system 130 as a whole prior to updating those sampling ratios. As such, controller module 305 may simulate one or more different scenarios with one or more different sampling ratios prior to updating one or more probes 205A-N. Moreover, in some cases, controller module 305 may translate Rules 1 and 2 into traffic or packet filters, and transmit corresponding filter parameters to respective probes 205A-N in order to implement such rules.

Another example of hypothetical sampling rules are provided in Table II below for purposes of illustration:

TABLE II

| Rule | Condition | Probe(s) | Priority | Sampling Ratio |
|---|---|---|---|---|
| 1 | Subscriber = {A-Z} | N, S | 0 | SR = 94% |
| 2 | Subscriber = {other than A-Z} | N, S | 3 | SR = 1.5% |
| 3 | Content_Type = {voice} | N | 1 | SR = 8% |
| 4 | Content_Type = {voice} | S | 1 | SR = 8% |
| 5 | Content_Type = {video} | N, S | 4 | SR = 0.1% |
| 6 | Content_Source = {premium} | N, S | 2 | SR = 25% |
| 7 | Content_Source = {free} | N, S | 5 | SR = 2% |

In contrast with the example of Table I, one or more of the rules shown in Table II may involve identifying a particular type of traffic based on content type, transport protocol, user session, etc. Generally speaking, any information obtainable by inspecting a packet (e.g., using deep packet inspection, etc.) may be used to create a rule. Also, in some embodiments, any combination of conditions may be connected by any suitable Boolean operator (e.g., Content-Type={video} AND Content-Source={premium}). As such, adaptive sampling engine 215 may be configured to apply sampling ratio modifications to different types of traffic selected with varying levels of granularity. An example of a technique involving a distinction between higher and lower-valued traffic is described in connection with FIG. 5.

Still referring to Table II, priority levels may not be limited to binary values, thus providing additional flexibility in adapting monitoring system 130 to changing conditions. For example, in a situation where controller module 305 may determine to reduce sampling ratios by a fixed amount (e.g., 10%), priority levels may be used as weights or multipliers to alter that fixed amount as applied to each respective sampling ratio. As such, a 10% down sampling adjustment determined by controlled module 305 may translate into a 40% reduction in the sampling ratio of Rule 5, a 20% reduction in the sampling ratio of rule 6, and a 10% reduction in the sampling ratio of Rule 4.

In further contrast with Table I, each of Rules 1-7 shown in Table II is associated with one or more probes (indicated as "North" and "South" for illustration). This implementation may be useful, for example, to enable adaptive sampling engine 215 to balance the modification of sampling ratios across specific probes in monitoring system 130. An example of a technique involving such adaptive sampling ratio balancing is described in more detail below in connection with FIG. 6.

As will be understood by a person of ordinary skill in the art in light of this disclosure, Tables I and II are provided for explanation only, and specific implementations of databases 310 and/or 315 may take a variety of forms. In some cases, some of the information shown in Tables I and/or II may be absent or stored in a different format. In other cases, other information not specifically discussed herein may be added. More generally, databases 310 and/or 315 may include any suitable type of application and/or data structure that may be configured as a persistent data repository. For example, databases 310 and/or 315 may be configured as relational databases that include one or more tables of columns and rows and that may be searched or queried according to a query language, such as a version of Structured Query Language (SQL). Alternatively, databases 310 and/or 315 may be configured as a structured data store that includes data records formatted according to a markup language, such as a version of eXtensible Markup Language (XML). In some embodiments, databases 310 and/or 315 may be implemented using one or more arbitrarily or minimally structured data files managed and accessible through a suitable program. Further, databases 310 and/or 315 may include a database management system (DBMS) configured to manage the creation, maintenance, and use of databases 310 and/or 315.

In various embodiments, blocks shown in FIGS. 2 and 3 may represent sets of software routines, logic functions, and/or data structures that are configured to perform specified operations. Although certain operations may be shown as distinct logical blocks, in some embodiments at least some of these operations may be combined into fewer blocks. Conversely, any given one of the blocks shown herein may be implemented such that its operations may be divided among two or more logical blocks. Moreover, although shown with a particular configuration, in other embodiments these various modules may be rearranged in other suitable ways.

Figure 4:
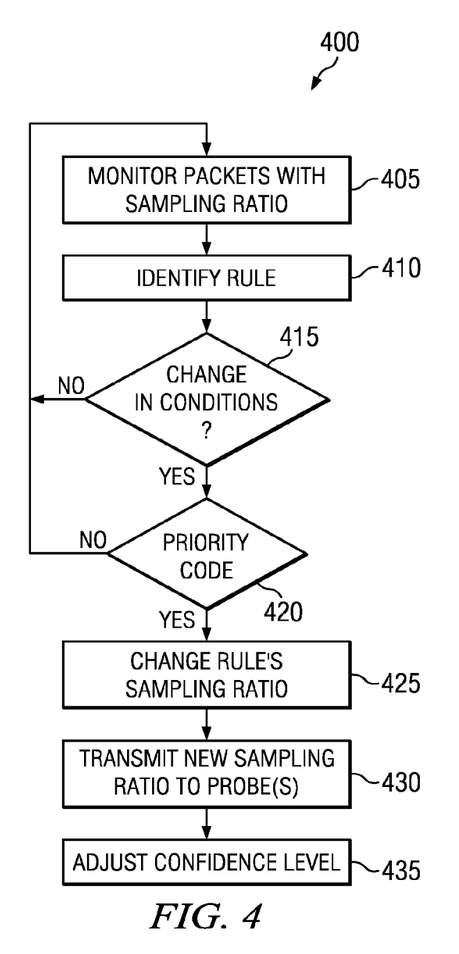
FIG. 4 is a flowchart of a method of adaptively determining a sampling ratio according to some embodiments.

FIG. 4 is a flowchart of a method of adaptively determining a sampling ratio. In some embodiments, method 400 may be performed, at least in part, by adaptive sampling engine 215. At block 405, method 400 may cause probes 205A-N within network monitoring system 130 to monitor packets with a given sampling ratio. At block 410, method 400 may identify one or more monitoring or sampling rules, such as, for example, those discussed above in connection with Tables I and/or II. At block 415, method 400 may detect a change in monitoring conditions. For example, one or more probes 205A-N may provide load information to sampling engine 215, which in turn may determine that the one or more probes 205A-N are non-functional, undergoing maintenance, operating near or at capacity, new probes have been introduced in the system, etc. Additionally or alternatively, self-learning module may provide historical or scheduling data that indicates peaks in network traffic or the like.

If sampling engine 215 detects or receives an indication that there has been (or will soon be) a change in monitoring conditions, then at block 420 it may examine priority codes associated with each sampling rule to determine whether their respective sampling ratios are modifiable. If so, then sampling engine 215 may modify or adjust one or more sampling ratios at block 425. On the other hand, if there is no change in network monitoring conditions or if the priority code of one or more rules does not allow modification, control may return to block 405.

After adjusting the one or more sampling ratios at block 425, method 400 may transmit an indication of the new or updated sampling ratio to respective probe(s). For example, adaptive sampling engine 215 may recreate or modify a packet filter with the new ratio and transmit the filter to one or more probes. In addition, method 400 may adjust a confidence level associated with KPIs calculated based on updated rules at block 435. Again, confidence levels generally follow changes in sampling ratios such that, for example, if the sampling ratio is reduced, the confidence level is also reduced.

An illustrative, non-limiting scenario that is suitable for employing method 400 includes VIP monitoring. In VIP monitoring, one or more rules may be created to establish a whitelist of subscribers that receive monitoring with highest confidence and data integrity. In this case, adaptive sampling engine 215 may be configured to monitor 100% of the traffic generated by whitelist subscribers, while other subscribers may be sampled at a lower rate and/or may be subject to adaptive modifications based on changing network monitoring conditions. An example of rules that may implement VIP monitoring is shown in Table I above.

Figure 5:
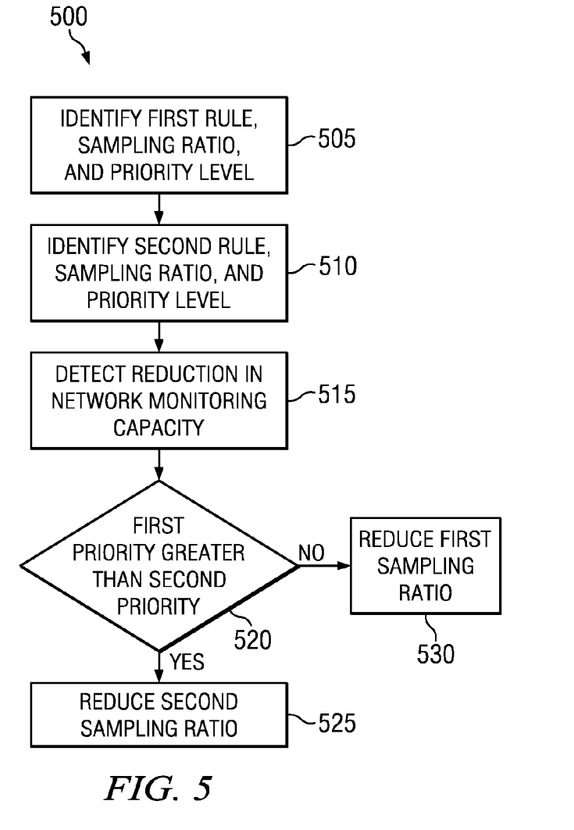
FIG. 5 is a flowchart of a method of priority-based adaptive monitoring according to some embodiments.

FIG. 5 is a flowchart of a method of priority-based adaptive monitoring. In some embodiments, method 500 may be performed, at least in part, by adaptive sampling engine 215. At block 505, method 500 may identify a first adaptive sampling rule, including a first sampling ratio and a first priority level or code. At block 510, method 500 may identify a second adaptive sampling rule, including a second sampling ratio and a second priority level or code. Then, at block 515, method 500 may detect a reduction in network monitoring capacity (e.g., probe(s) go offline, load information indicates probe(s) overload, upcoming scheduled maintenance, peak traffic hours, etc.)

As such, at block 520, method 500 may compare the first and second priority levels. In some cases, if the first priority is greater than the second priority (e.g., first priority is "0" and second priority is "1"), the method 500 may reduce the second sampling ratio at block 525. Conversely, if the second priority is greater than the first priority, then method 500 may reduce the first sampling ratio at block 530. In alternative embodiments, both the first and second sampling ratios may be reduced, each in proportion to its respective priority ratio.

An illustrative, non-limiting scenario that is suitable for employing method 500 includes high-value traffic monitoring. In this instance, one or more rules may be set up to distinguish between certain types of traffic that may be considered of high-value (e.g., premium video provided by a particular content source) and other types of traffic considered to be low-value (e.g., free video). In some embodiments, this distinction may be manually configured in the rule database 315. Additionally or alternatively, such distinction may be automatically recognized by self-learning module 320 as it observes the system user's usage patterns when operating monitoring system 130. In either case, adaptive sampling engine 215 under low resource conditions may reduce sampling ratio of the low-value traffic, for example. As a result, KPIs such as throughput/latency calculated based on the low-value traffic will have a lower confidence level, although still representative of the overall KPI trend. In some cases, the monitoring of high-value traffic may remain unaffected.

Figure 6:
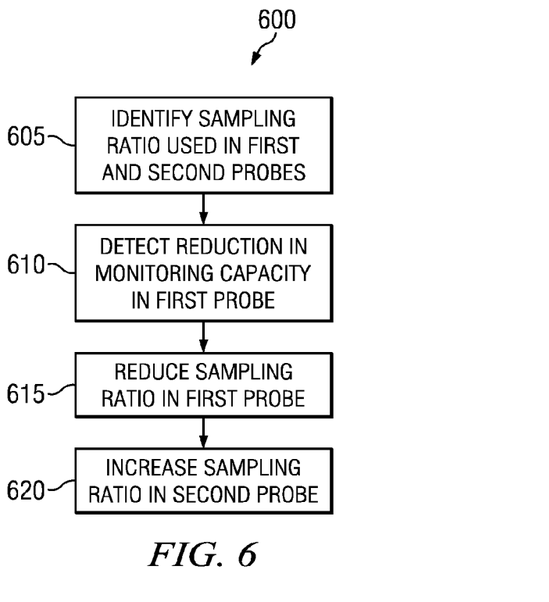
FIG. 6 is a flowchart of a method of sampling ratio balancing according to some embodiments.

FIG. 6 is a flowchart of a method of sampling ratio balancing. In some embodiments, method 600 may be performed, at least in part, by adaptive sampling engine 215. At block 605, method 600 may identify a sampling ratio associated with a same rule in a first and a second probe. At block 610, method 600 may detect or predict a reduction in monitoring capacity in the first probe. Accordingly, at block 615, method 600 may reduce the sampling ratio associated with the first probe. In an attempt to compensate for the reduction in the first probe, method 600 may increase the sampling ratio associated with the second probe. Moreover, the increase in the second probe may be such as to maintain a statistical confidence level associated with a performance indicator (e.g., an aggregated indicator that combines KPIs resulting from the first and second probe) calculated for traffic that is selected based on the rule.

An illustrative, non-limiting scenario that is suitable for employing method 600 includes high-value traffic monitoring. In this example, a probe may be deployed next to an SGSN in a mobile network to monitor mobile data. A network maintenance event may shut down one of the SGSNs in the pool, and this particular SGSN may experience higher than normal data volumes. The probe may be on the verge of exceeding resource capacity to monitor the data. As the probe reports resource condition back to adaptive sampling engine 215, the engine may issue lower sampling ratios to the probe. It may also issue higher sampling ratios to other probes in the system, so that the overall confidence levels on the performance indicators are not changed. In some cases, adaptive sampling engine 215 may temporarily block a new performance study configured by a system user and scheduled it for later time (e.g., as agreed by the system user).

Figure 7:
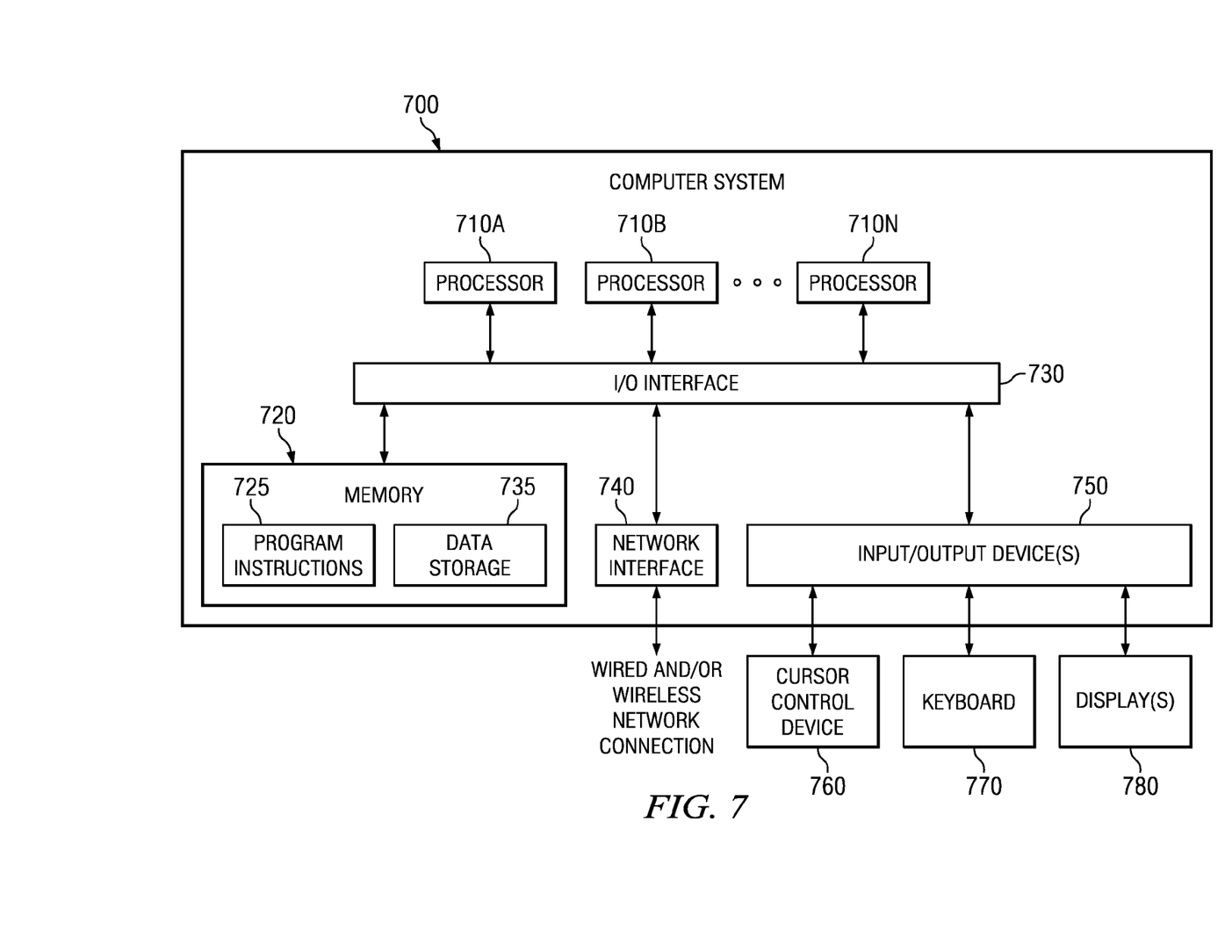
FIG. 7 is a block diagram of a computer system configured to implement various systems and methods described herein according to some embodiments.

Aspects of network monitoring system 100 may be implemented or executed by one or more computer systems. One such computer system is illustrated in FIG. 7. In various embodiments, computer system 700 may be a server, a mainframe computer system, a workstation, a network computer, a desktop computer, a laptop, or the like. For example, in some cases, front-end monitoring probe 205 shown in FIG. 2 may be implemented as computer system 700. Moreover, one or more of analyzer devices 210 and/or intelligence engine may include one or more computers in the form of computer system 700. As explained above, in different embodiments these various computer systems may be configured to communicate with each other in any suitable way, such as, for example, via network 100.

As illustrated, computer system 700 includes one or more processors 710 coupled to a system memory 720 via an input/output (I/O) interface 730. Computer system 700 further includes a network interface 740 coupled to I/O interface 730, and one or more input/output devices 750, such as cursor control device 760, keyboard 770, and display(s) 780. In some embodiments, a given entity (e.g., network monitoring system 110) may be implemented using a single instance of computer system 700, while in other embodiments multiple such systems, or multiple nodes making up computer system 700, may be configured to host different portions or instances of embodiments. For example, in an embodiment some elements may be implemented via one or more nodes of computer system 700 that are distinct from those nodes implementing other elements (e.g., a first computer system may implement classification engine 310 while another computer system may implement routing/distribution control module 330).

In various embodiments, computer system 700 may be a single-processor system including one processor 710, or a multi-processor system including two or more processors 710 (e.g., two, four, eight, or another suitable number). Processors 710 may be any processor capable of executing program instructions. For example, in various embodiments, processors 710 may be general-purpose or embedded processors implementing any of a variety of instruction set architectures (ISAs), such as the x86, POWERPC®, ARM®, SPARC®, or MIPS® ISAs, or any other suitable ISA. In multi-processor systems, each of processors 710 may commonly, but not necessarily, implement the same ISA. Also, in some embodiments, at least one processor 710 may be a graphics processing unit (GPU) or other dedicated graphics-rendering device.

System memory 720 may be configured to store program instructions and/or data accessible by processor 710. In various embodiments, system memory 720 may be implemented using any suitable memory technology, such as static random access memory (SRAM), synchronous dynamic RAM (SDRAM), nonvolatile/Flash-type memory, or any other type of memory. As illustrated, program instructions and data implementing certain operations, such as, for example, those described herein, may be stored within system memory 720 as program instructions 725 and data storage 735, respectively. In other embodiments, program instructions and/or data may be received, sent or stored upon different types of computer-accessible media or on similar media separate from system memory 720 or computer system 700. Generally speaking, a computer-accessible medium may include any tangible storage media or memory media such as magnetic or optical media—e.g., disk or CD/DVD-ROM coupled to computer system 700 via I/O interface 730. Program instructions and data stored on a tangible computer-accessible medium in non-transitory form may further be transmitted by transmission media or signals such as electrical, electromagnetic, or digital signals, which may be conveyed via a communication medium such as a network and/or a wireless link, such as may be implemented via network interface 740.

In an embodiment, I/O interface 730 may be configured to coordinate I/O traffic between processor 710, system memory 720, and any peripheral devices in the device, including network interface 740 or other peripheral interfaces, such as input/output devices 750. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. In addition, in some embodiments some or all of the functionality of I/O interface 730, such as an interface to system memory 720, may be incorporated directly into processor 710.

Network interface 740 may be configured to allow data to be exchanged between computer system 700 and other devices attached to network 115, such as other computer systems, or between nodes of computer system 700. In various embodiments, network interface 740 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

Input/output devices 750 may, in some embodiments, include one or more display terminals, keyboards, keypads, touch screens, scanning devices, voice or optical recognition devices, or any other devices suitable for entering or retrieving data by one or more computer system 700. Multiple input/output devices 750 may be present in computer system 700 or may be distributed on various nodes of computer system 700. In some embodiments, similar input/output devices may be separate from computer system 700 and may interact with one or more nodes of computer system 700 through a wired or wireless connection, such as over network interface 740.

As shown in FIG. 7, memory 720 may include program instructions 725, configured to implement certain embodiments described herein, and data storage 735, comprising various data accessible by program instructions 725. In an embodiment, program instructions 725 may include software elements of embodiments illustrated in FIG. 2. For example, program instructions 725 may be implemented in various embodiments using any desired programming language, scripting language, or combination of programming languages and/or scripting languages (e.g., C, C++, C#, JAVA®, JAVASCRIPT®, PERL®, etc). Data storage 735 may include data that may be used in these embodiments. In other embodiments, other or different software elements and data may be included.

A person of ordinary skill in the art will appreciate that computer system 700 is merely illustrative and is not intended to limit the scope of the disclosure described herein. In particular, the computer system and devices may include any combination of hardware or software that can perform the indicated operations. In addition, the operations performed by the illustrated components may, in some embodiments, be performed by fewer components or distributed across additional components. Similarly, in other embodiments, the operations of some of the illustrated components may not be performed and/or other additional operations may be available. Accordingly, systems and methods described herein may be implemented or executed with other computer system configurations.

The various techniques described herein may be implemented in software, hardware, or a combination thereof. The order in which each operation of a given method is performed may be changed, and various elements of the systems illustrated herein may be added, reordered, combined, omitted, modified, etc. It will be understood that various operations discussed herein may be executed simultaneously and/or sequentially. It will be further understood that each operation may be performed in any order and may be performed once or repetitiously. Various modifications and changes may be made as would be clear to a person of ordinary skill in the art having the benefit of this specification. It is intended that the invention(s) described herein embrace all such modifications and changes and, accordingly, the above description should be regarded in an illustrative rather than a restrictive sense.

The invention claimed is:

1. A method, comprising:
 performing, by a network monitoring system,
  monitoring traffic transmitted through a mobile telecommunications network via a first monitoring probe and via a second monitoring probe;
  identifying a monitoring rule, the monitoring rule associating a first portion of the monitored traffic with a first monitoring sampling ratio at the first monitoring probe, and the monitoring rule associating a second portion of the monitored traffic with a second monitoring sampling ratio at the second monitoring probe; and
  in response to a change in network monitoring conditions, reducing the first monitoring sampling ratio and increasing the second monitoring sampling ratio by an amount configured to offset the change in the network monitoring conditions and to maintain a statistical confidence level associated with a performance indicator, the performance indicator calculated based, at least in part, upon the first and second portions of the monitored traffic.

2. The method of claim 1, wherein the first and second portions of the monitored traffic include traffic having at least one of: a common address, a common subscriber identifier, a common transport protocol, a common port number, or a common content type.

3. The method of claim 1, wherein the performance indicator includes at least one of: a service performance indicator, a network congestion indicator, a connection maintenance indicator, a service quality indicator, or a network availability indicator.

4. The method of claim 1, wherein the change in network monitoring conditions includes a change in the operation of network equipment.

5. The method of claim 1, further comprising:
 performing, by the network monitoring system,
  predicting the change in network monitoring conditions based, at least in part, upon historical network data.

6. The method of claim 1, further comprising:
 performing, by the network monitoring system, identifying the change in network monitoring conditions based, at least in part, upon a network maintenance schedule.

7. The method of claim 1, wherein the change in monitoring conditions causes a decrease in monitoring capacity in the first monitoring probe.

8. The method of claim 1, wherein reducing the first monitoring sampling ratio and increasing the second monitoring sampling ratio includes reducing the first monitoring sampling ratio and increasing the second monitoring sampling ratio in response to a determination that one or more priority codes associated with the monitoring rule allow the reduction and increase.

9. The method of claim 1, further comprising:
performing, by the network monitoring system,
transmitting an indication of the reduced first monitoring sampling ratio to the first monitoring probe and transmitting an indication of the increased second monitoring sampling ratio to the second monitoring probe.

10. A network monitoring system, comprising:
a processor; and
a memory coupled to the processor, the memory configured to store program instructions executable by the processor to cause the network monitoring system to:
identify a first monitoring rule, the first monitoring rule configured to associate a first portion of monitored network traffic with a first monitoring sampling ratio, the first monitoring rule having a first priority level;
identify a second monitoring rule, the second monitoring rule configured to associate a second portion of monitored network traffic with a second monitoring sampling ratio, the second monitoring rule having a second priority level;
detect a reduction in monitoring capacity; and
in response to the first priority level being greater than the second priority level, reduce the second monitoring sampling ratio based, at least in part, upon the reduction in monitoring capacity, by an amount configured to offset the reduction in monitoring capacity and to maintain a statistical confidence level associated with one or more performance indicators, the one or more performance indicators calculated based, at least in part, upon the first and second portions of monitored traffic.

11. The network monitoring system of claim 10, wherein to detect the reduction in monitoring capacity, the program instructions are further executable by the processor to cause the network monitoring system to:
predict the reduction in monitoring capacity based, at least in part, upon historical data.

12. The network monitoring system of claim 10, wherein to detect the reduction in monitoring capacity, the program instructions are further executable by the processor to cause the network monitoring system to:
identify the reduction in monitoring capacity based, at least in part, upon maintenance information.

13. The network monitoring system of claim 10, the program instructions further executable by the processor to cause the network monitoring system to:
transmit the reduced second monitoring sampling ratio to one or more probes; and
reduce a statistical confidence level associated with the one or more performance indicators.

14. A non-transitory computer-readable storage medium having program instructions stored thereon that, upon execution by a processor within a network monitoring system, cause the network monitoring system to:
identify a network monitoring rule implemented via a first monitoring probe and via a second monitoring probe, the network monitoring rule associating a first portion of monitored network traffic with a first monitoring sampling ratio at the first monitoring probe, and the network monitoring rule associating a second portion of monitored traffic with a second monitoring sampling ratio at the second monitoring probe; and
in response to a capacity reduction in the first monitoring probe, reduce the first monitoring sampling ratio and increase the second monitoring sampling ratio by an amount configured to offset the reduction in the first monitoring sampling ratio and maintain a statistical confidence level associated with a performance indicator, the performance indicator calculated based, at least in part, upon the first and second portions of monitored traffic.

15. The non-transitory computer-readable storage medium of claim 14, wherein, prior to reducing the first monitoring sampling ratio and increasing the second monitoring sampling ratio, the first and second monitoring sampling ratios are equal to each other.

16. The non-transitory computer-readable storage medium of claim 14, wherein, prior to reducing the first monitoring sampling ratio and increasing the second monitoring sampling ratio, the first and second monitoring sampling ratios are different from each other.

17. The non-transitory computer-readable storage medium of claim 14, wherein, prior to reducing the first monitoring sampling ratio and increasing the second monitoring sampling ratio, the first monitoring sampling ratio is proportional to a first volume of traffic received by the first monitoring probe and the second monitoring sampling ratio is proportional to a second volume of traffic received by the second monitoring probe.

* * * * *